United States Patent
Bharucha et al.

(10) Patent No.: US 11,358,728 B2
(45) Date of Patent: Jun. 14, 2022

(54) CENTER-OF-PRESSURE ARM RESTRAINT SYSTEM

(71) Applicant: AMI Industries, Inc., Colorado Springs, CO (US)

(72) Inventors: Nicholas K Bharucha, Colorado Springs, CO (US); Steve Holstine, Colorado Springs, CO (US); John Hampton, Colorado Springs, CO (US); Casey Andrew Stribrny, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 132 days.

(21) Appl. No.: 16/988,421

(22) Filed: Aug. 7, 2020

(65) Prior Publication Data
US 2022/0041292 A1    Feb. 10, 2022

(51) Int. Cl.
*B64D 25/10* (2006.01)
*B64D 25/04* (2006.01)

(52) U.S. Cl.
CPC ............. *B64D 25/10* (2013.01); *B64D 25/04* (2013.01)

(58) Field of Classification Search
CPC ......... B64D 25/04; B64D 25/08; B64D 25/10
See application file for complete search history.

(56) References Cited

U.S. PATENT DOCUMENTS

| 4,081,156 | A | * | 3/1978 | Ideskar | B64D 25/02 244/122 AG |
|---|---|---|---|---|---|
| 4,215,835 | A | * | 8/1980 | Wedgwood | B64D 25/02 244/122 AG |
| 4,359,200 | A |  | 11/1982 | Brevard et al. |  |
| 4,667,902 | A | * | 5/1987 | Zenobi | B64D 25/02 244/122 A |
| 5,415,366 | A | * | 5/1995 | Mastrolia | B64D 25/02 244/122 AG |
| 8,485,471 | B2 |  | 7/2013 | Patterson |  |
| 2011/0114790 | A1 | * | 5/2011 | Patterson | B64D 25/02 244/122 AG |
| 2021/0147084 | A1 |  | 5/2021 | Shook |  |

FOREIGN PATENT DOCUMENTS

GB    2475371    5/2011

OTHER PUBLICATIONS

United Kingdom Intellectual Property Office, United Kingdom Search Report dated Sep. 30, 2021 in Application No. GB2110714.9.

* cited by examiner

*Primary Examiner* — Richard G Davis
(74) *Attorney, Agent, or Firm* — Snell & Wilmer L.L.P.

(57) ABSTRACT

An ejection seat is disclosed. In various embodiments, the ejection seat includes a seat frame having a seat-back and a seat-pan adapted to support an occupant and a propulsion system configured to propel the ejection seat from an aircraft; and a backstop configured to deploy laterally outward from the seat-back to form a forward-facing surface, the backstop including a net structure and an aerodynamic control mechanism incorporated into the net structure.

20 Claims, 5 Drawing Sheets

CENTER-OF-PRESSURE ARM RESTRAINT SYSTEM

FIELD

The present disclosure relates to ejection seats and, more particularly, to ejection seats having arm restraint systems configured to reduce pitch and yaw following ejection from an aircraft.

BACKGROUND

Various aircraft include one or more ejection seats configured to eject a pilot or other occupant from the aircraft during an emergency. When a pilot or other occupant ejects from an aircraft moving at high speed relative to the surrounding air, the pilot or other occupant is quickly subjected to a high-speed windblast, resulting in extreme pressure-induced forces imposed on the pilot or other occupant and the ejection seat. These forces may cause the arms of the pilot or other occupant to flail about, thereby exposing the pilot or other occupant to injury unless constrained. The forces may also cause the ejection seat to roll, pitch or yaw in an uncontrollable or an undesirable fashion, complicating separation of the pilot or other occupant from the seat and deployment of the parachute.

SUMMARY

An ejection seat is disclosed. In various embodiments, the ejection seat includes a seat frame having a seat-back and a seat-pan adapted to support an occupant and a propulsion system configured to propel the ejection seat from an aircraft; and a backstop configured to deploy laterally outward from the seat-back to form a forward-facing surface, the backstop including a net structure and an aerodynamic control mechanism incorporated into the net structure.

In various embodiments, the aerodynamic control mechanism includes a first patch incorporated into the net structure. In various embodiments, the aerodynamic control mechanism includes a second patch incorporated into the net structure. In various embodiments, the backstop defines a frontal area when deployed and the first patch is configured to cover about five percent of the frontal area. In various embodiments, the second patch is configured to cover about five percent of the frontal area.

In various embodiments, the aerodynamic control mechanism includes a first cutout incorporated into a sheet of material. In various embodiments, the aerodynamic control mechanism includes a second cutout incorporated into the sheet of material. In various embodiments, the backstop defines a frontal area when deployed, the sheet of material is configured to cover the frontal area, and the first cutout is sized to span about five percent of the frontal area. In various embodiments, the second cutout is sized to span about five percent of the frontal area.

An ejection seat for an aircraft is disclosed. In various embodiments, the ejection seat includes a seat frame having a seat-back and a seat-pan adapted to support an occupant; and a backstop configured to deploy laterally outward from the seat-back to form a forward-facing surface that defines a frontal area, the backstop including an upper support arm and a lower support arm configured to support a plurality of shrouds forming a net structure and an aerodynamic control mechanism incorporated into the net structure, the aerodynamic control mechanism comprising a sheet of material.

In various embodiments, the sheet of material is configured to cover between about twenty-five percent and about seventy-five percent of the frontal area. In various embodiments, the sheet of material includes a first patch, the first patch configured to cover about five percent of the frontal area. In various embodiments, the sheet of material includes a second patch, the second patch configured to cover about five percent of the frontal area. In various embodiments, the first patch is spaced a distance from the second patch.

In various embodiments, the sheet of material includes a first patch, the first patch being secured to one or more of the plurality of shrouds. In various embodiments, the first patch includes a portion secured to the seat frame. In various embodiments, the sheet of material includes a first cutout configured to span at least about five percent of the frontal area. In various embodiments, the sheet of material includes a second cutout configured to span at least about five percent of the frontal area. In various embodiments, the first cutout is spaced a distance from the second cutout. In various embodiments, the sheet of material includes a patch and a cutout adjacent the patch.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
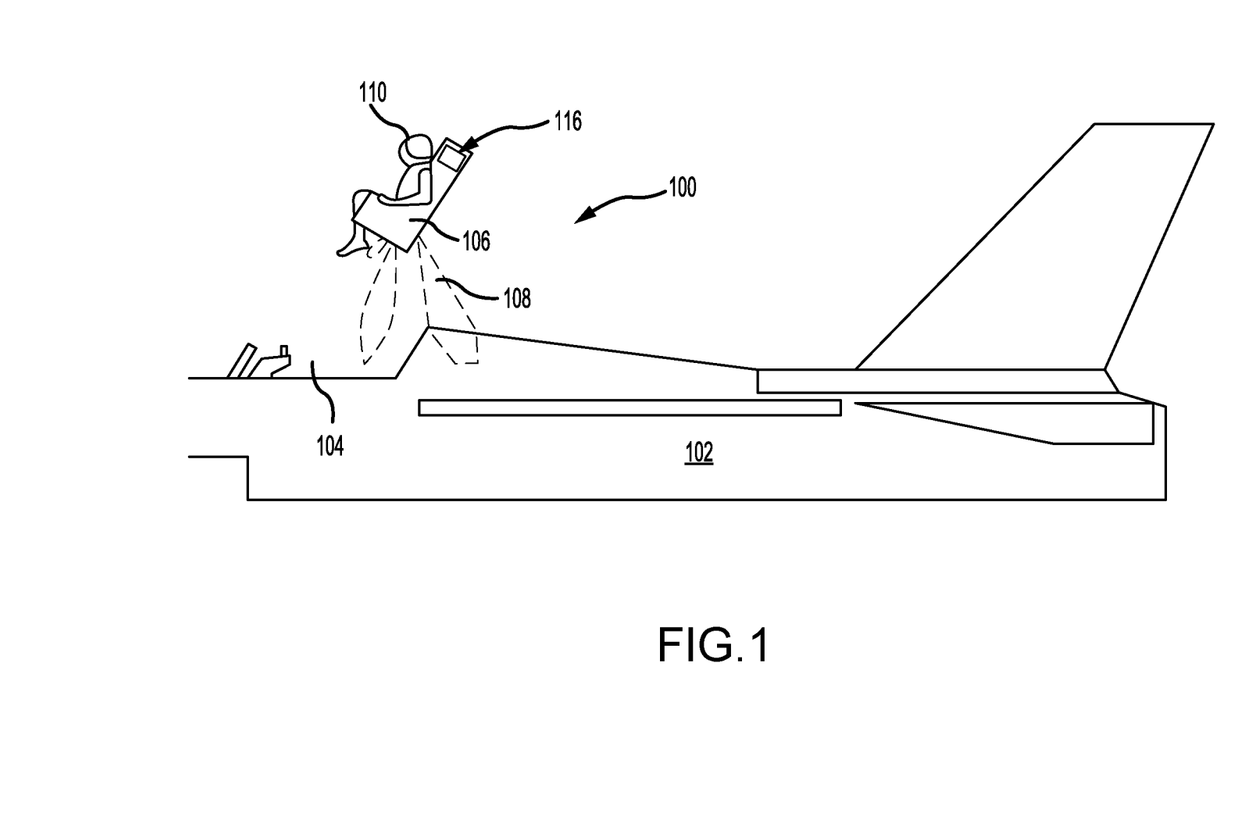
FIG. 1 illustrates an ejection seat being launched from an aircraft cockpit, in accordance with various embodiments.

With reference now to the drawings, FIG. 1, illustrates an aircraft ejection system 100, in accordance with various embodiments. The aircraft ejection system 100 may be installed in an aircraft 102 to safely expel an ejection seat 106 and an occupant 110 of the ejection seat 106 from a cockpit 104 of the aircraft 102. The ejection seat 106 may be urged from the cockpit 104 by a propulsion system 108. The aircraft ejection system 100 may include a parachute assembly 116. In various embodiments, prior to deployment of the parachute assembly 116, a portion of the parachute assembly 116 may be stored within the ejection seat 106.

Figure 2:
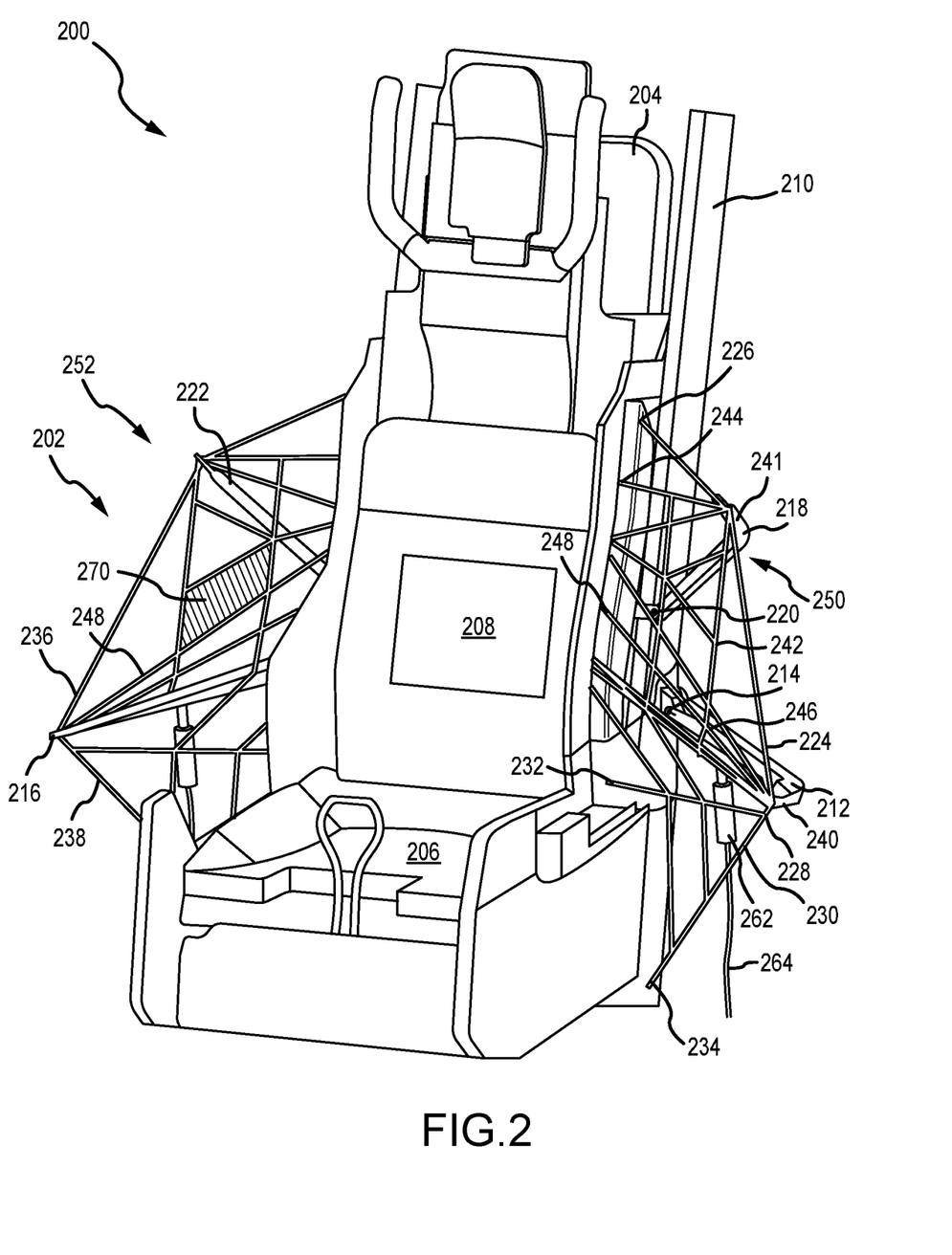
FIG. 2 provides a schematic view of an ejection seat having a center-of-pressure arm restraint system, in accordance with various embodiments.

Referring now to FIG. 2, a schematic view of an ejection seat 200 having a center-of-pressure arm restraint system 202 is provided, in accordance with various embodiments. The ejection seat 200 comprises a seat frame 204 having a seat-pan portion 206 and a seat-back portion 208. The seat frame 204 is formed of any suitable material, including, for example, aluminum alloys, titanium alloys or composite materials. The ejection seat 200 is launched by a propulsion system, including, for example, a catapult or a solid rocket motor, either or both of which is configured to propel the ejection seat 200 out of the aircraft along a launch rail 210. A first lower support arm 212 (or a left-side lower support arm) is attached to the seat frame 204 via a first ratcheting hinge 214, the purpose of which will be explained more fully below. Similarly, a second lower support arm 216 (or a right-side lower support arm) is attached to the seat frame 204 via a second ratcheting hinge (hidden). A first upper support arm 218 (or a left-side upper support arm) is attached to the seat frame 204 via a first non-ratcheting hinge 220. A second upper support arm 222 (or a right-side upper support arm) is similarly attached to the seat frame 204 via a second non-ratcheting hinge (hidden). The upper and lower support arms may be formed of any suitably strong, rigid and lightweight material, such as, for example, carbon fiber, titanium or aluminum alloy and may exhibit an I-beam cross section to maximize the moment of inertia of the arms.

In various embodiments, a first primary cable 224 (or a left-side primary cable) is secured at a first end 226 (or an upper end) to the seat frame 204. A second end 228 (or a lower end) of the first primary cable 224 is spliced to a first lower support cable 230 (or a left-side lower support cable), which is secured to the seat frame 204 at a first end 232 and a second end 234. Similarly, a second primary cable 236 (or right-side primary cable) is secured at a first end (or an upper end) to the seat frame 204, while a second end (or a lower end) of the second primary cable 236 is spliced to a second lower support cable 238 (or a right-side lower support cable), which is secured to the seat frame 204 at a first end and a second end in a fashion similar to the first lower support cable 230.

In various embodiments, the first primary cable 224 is routed through an eye at a free end 240 of the first lower support arm 212 and through an eye located at a free end 241 of the first upper support arm 218. The second primary cable 236 is similarly routed through eyes in the free ends of the second lower support arm 216 and the second upper support arm 222. A first secondary cable 242 is secured to the seat frame 204 at an upper end 244. A lower end 246 of the first secondary cable 242 is attached to one of a plurality of tertiary cables 248 that run between the seat frame 204 and a plurality of eyes located at the free end 240 of the first lower support arm 212. A second secondary cable (or right-side secondary cable) is of substantially identical construction and connection as the first secondary cable 242. As illustrated in FIG. 2, the cables discussed above form a first backstop 250 (or a left-side backstop) in the form of a first net and a second backstop 252 (or a right-side backstop) in the form of a second net, each being comprised of a plurality of relatively small-diameter shrouds that would cause little wind resistance as compared with the relatively large-diameter shrouds comprised within the first primary cable 224 and the second primary cable 236. In various embodiments, an attenuator 262 is attached to the first lower support arm 212 and triggered via a deployment cable 264, which is attached to an anchor secured to the aircraft frame.

The cables (or the plurality of shrouds) forming the first backstop 250 and the second backstop 252 may be of any suitable material having sufficiently low elongation or stretch such that the force of an occupant's arm striking a backstop does not deform the backstop a sufficient distance for the occupant's arms to impact one of the upper or lower support arms. In various embodiments, for example, the cables or shrouds may comprise a woven aramid fiber (e.g., Kevlar®) having an elongation not greater than approximately five percent (5%). The length of the cables or shrouds are selected such that as the support arms deploy, the cables are tensioned to approximately two hundred pound-force (200 lbf≈890 N) such that upon impact with a 90$^{th}$ percentile occupant's arms at 600 knots, the backstop elastically deforms and recovers, in various embodiments, no more than 3 inches (≈7.62 cm) or, in various embodiments, between 1-2 inches (≈2.54-5.08 cm) or, in various embodiments, approximately one inch (≈2.54 cm) at its maximum deflection.

As described further below, one or both of the first backstop 250 and the second backstop 252 include an aerodynamic control mechanism or feature, or a plurality of such aerodynamic control mechanisms or features, incorporated into the net structure of the backstops. The aerodynamic control mechanisms or features function to reduce or alleviate aerodynamic imbalances of the ejection seat system, including the combination of the ejection seat, the pilot and the backstops when deployed. In various embodiments, for example, and as illustrated in FIG. 2, a patch 270 (or a panel) is incorporated into the second backstop 252. The patch 270 may be attached to pluralities of adjacent cables to form triangular or quadrilateral or, more generally, polygonal structures (regular or irregular), the size and shape of which may be configured to control the aerodynamic forces on the ejection seat, including the backstops, when deployed. Effective placement and sizing of the patches, which may be determined through wind-tunnel testing or computational fluid dynamics modeling, may result in a reduction in, for example, the pitch and yaw of the ejection seat and the pilot during an ejection sequence or process into a high speed windblast. As discussed further below, in various embodiments, a cutout (or a plurality of cutouts) from a relatively large covering (e.g., a large sheet of material or a plurality of patches that collectively form a large sheet of material) may also be employed to control the aerodynamic forces on the ejection seat, including the backstops, when deployed. In various embodiments, the material comprising the sheets or patches comprises a woven aramid fiber (e.g., Kevlar®), similar to the material used to form the cables or shrouds comprising the net structures of the backstops, nylon or any other sheet or fibrous material capable of withstanding the aerodynamic and impact (e.g., the force of the arms impacting the backstops) loads associated with an ejection operation.

Figures 3A, 3B:
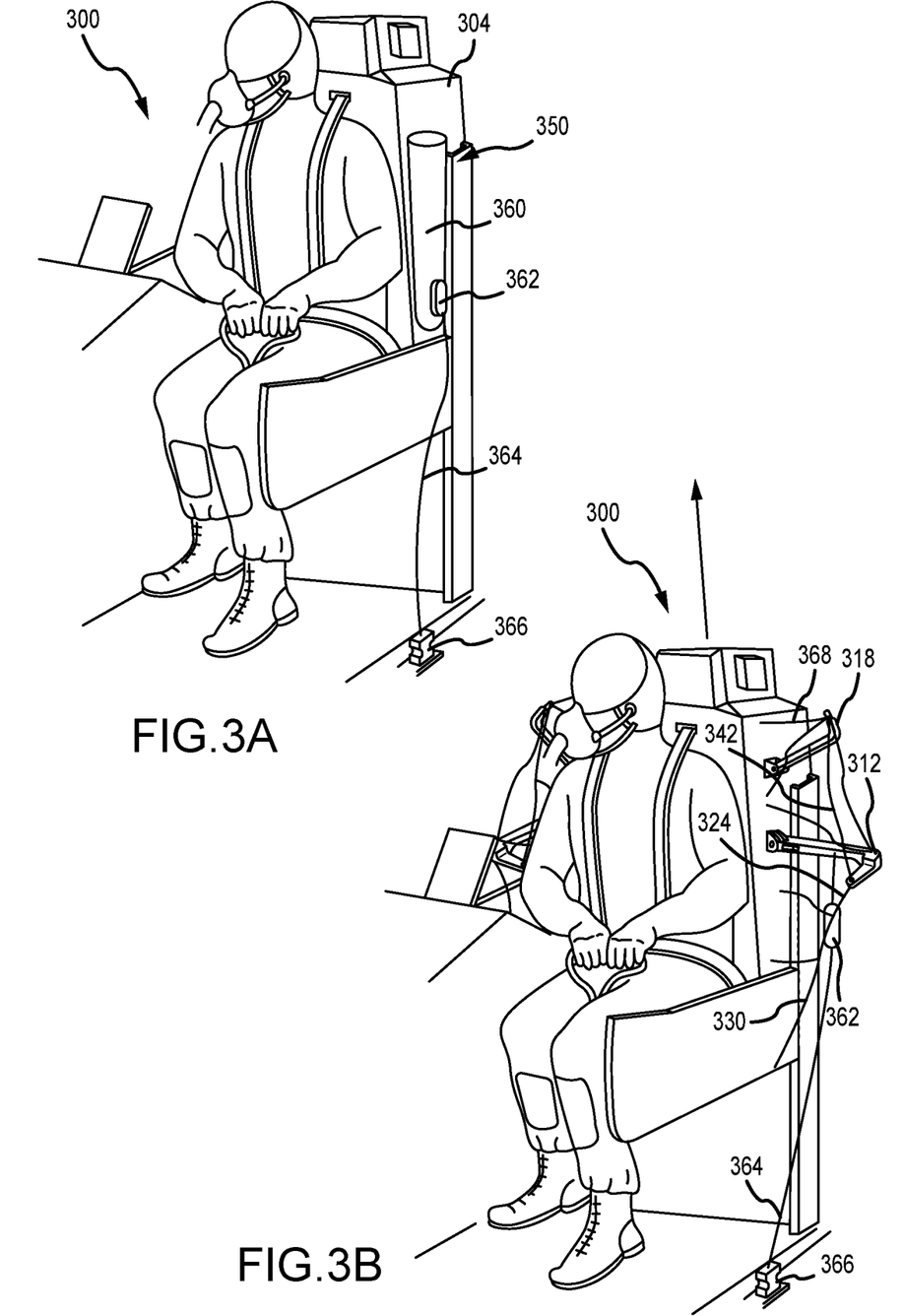
FIGS. 3A, 3B and 3C provide schematic views of an ejection seat having a center-of-pressure arm restraint system undergoing an ejection sequence or operation, in accordance with various embodiments.

Referring now to FIGS. 3A, 3B and 3C, a description of the operation of an ejection seat 300, similar to the ejection seat 200 described above, is provided. With reference to FIG. 3A, a first backstop 350 is shown in its undeployed condition with a lower support arm 312 and an upper support arm 318 folded against a seat frame 304 and stored within a container 360. An attenuator 362 is attached to the lower support arm 312 and triggered via a deployment cable 364, which is attached to an anchor 366 secured to the aircraft frame. As shown in FIG. 3B, as the ejection seat 300 is propelled out the aircraft, the attenuator 362 pulls the lower support arm 312 out of the container 360 and along with it a primary cable 324 and the remaining components of the first backstop 350. A cable stop 368 (or a splice of similar device) is attached to the primary cable 324 at a predetermined location. As the lower support arm 312 is deployed by the attenuator 362 (after being triggered by the deployment cable 364), the upper support arm 318 is also deployed until halted by the cable stop 368. This method of deployment causes the primary cable 324 and a lower support cable 330 to tension before a secondary cable 342. Thus, the section below the lower support arm 312 is fully tensioned when the lower support arm 312 is at an angle of between about ten degrees (10°) above or below the horizontal while the section above the lower support arm 312 is fully tensioned when the lower support arm 312 is at an angle of between about twenty degrees (20°) below or above the horizontal (relative to the seat-back). A second backstop 352 on the right side of the ejection seat 300 is deployed in similar fashion.

Figure 3C:
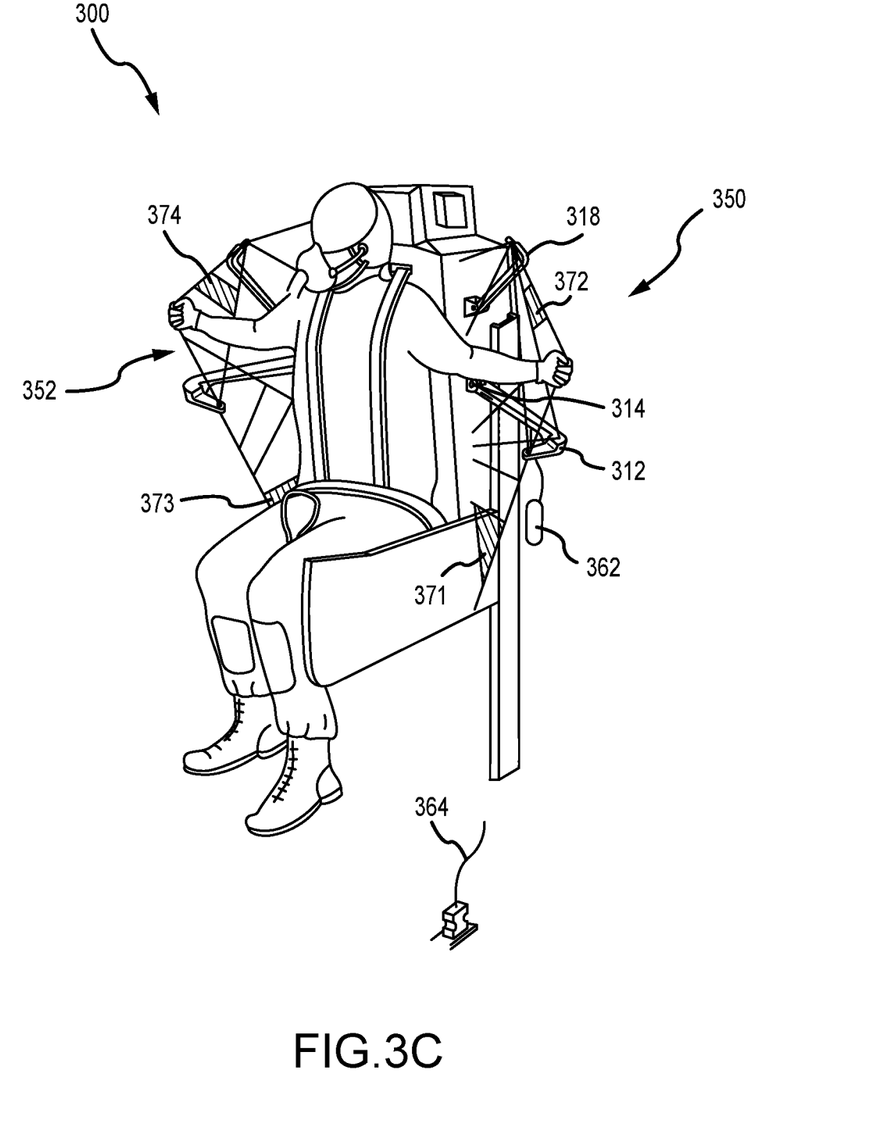

As show in FIG. 3C, as the ejection seat 300 exits the aircraft, the deployment cable 364 continues to pull the lower support arm 312 downward, thereby tensioning the cables that form the first backstop 350. At a predetermined tension, a rip stitch in the attenuator 362 fractures, allowing the deployment cable 364 to separate from the attenuator 362. The ratcheting hinge 314, attaching the lower support arm 312 to the seat frame 304, then locks the lower support arm 312 in position against the tension of the primary, the secondary and the tertiary cables. As the ejection seat 300 enters the windblast, the occupant's arms flail backwards until they impact the first backstop 350 and the second backstop 352, each of which provides a forward-facing surface configured to safely arrest the rearward motion of the occupant's arms.

As may be seen from the various drawings, although the first backstop 350 and the second backstop 352 deploy outward, they do not deploy perpendicular to the forward direction of ejection seat 300, but are deployed forward approximately fifteen degrees (15°) from the perpendicular. Accordingly, the disclosure is not intended to be limited to a backstop in which the entirety of the structure is rearward of the occupant. Any structure in which the occupant's arms are allowed to intentionally flail backwards until the rearward motion is arrested by a backstop with the occupant's arms at a sufficiently oblique angle to the windblast that the windblast itself holds the occupant's arms safely against the backstop is considered within the scope of the disclosure. Accordingly, although in the illustrative embodiments the forward angles of the backstops are approximately fifteen degrees, a forward deployment angle of zero up to thirty, thirty-five or even forty degrees forward of the perpendicular is considered within the scope of the disclosure.

Still referring to FIG. 3C, a plurality of patches is illustrated incorporated into the first backstop 350 and the second backstop 352. For example, a first patch 371 is illustrated as being attached to a lower support cable (e.g., the first lower support cable 230 described above with reference to FIG. 2) and a left side of the ejection seat 300. Likewise, a second patch 372 is illustrated as being attached to a first primary cable (e.g., the first primary cable 224 described above) and one or more of the secondary or tertiary cables or shrouds that comprise the net structure of the first backstop 350. In similar fashion, a third patch 373 is illustrated as being attached to a lower support cable (e.g., the second lower support cable 238 described above with reference to FIG. 2) and a right side of the ejection seat 300, while a fourth patch 374 is illustrated as being attached to a second primary cable (e.g., the second primary cable 236 described above) and one or more of the secondary or tertiary cables or shrouds that comprise the net structure of the second backstop 352. More generally, the plurality of patches may be incorporated into the net structures by attaching the patches to any of the cables or shrouds that comprise the net structures as well as to portions of the seat frame (see FIG. 3C) or even to the upper and lower support arms. Further, in various embodiments, the plurality of patches is not placed symmetrically on the net structures of both the first backstop 350 and the second backstop 352. This latter feature enables, for example, weight imbalances with the ejection seat 300 to be compensated for by generating moment arms that act on the seat, thereby generating a torque on the seat that act to counterbalance a tendency of the seat to pitch or yaw due to a weight imbalance.

Figure 4:
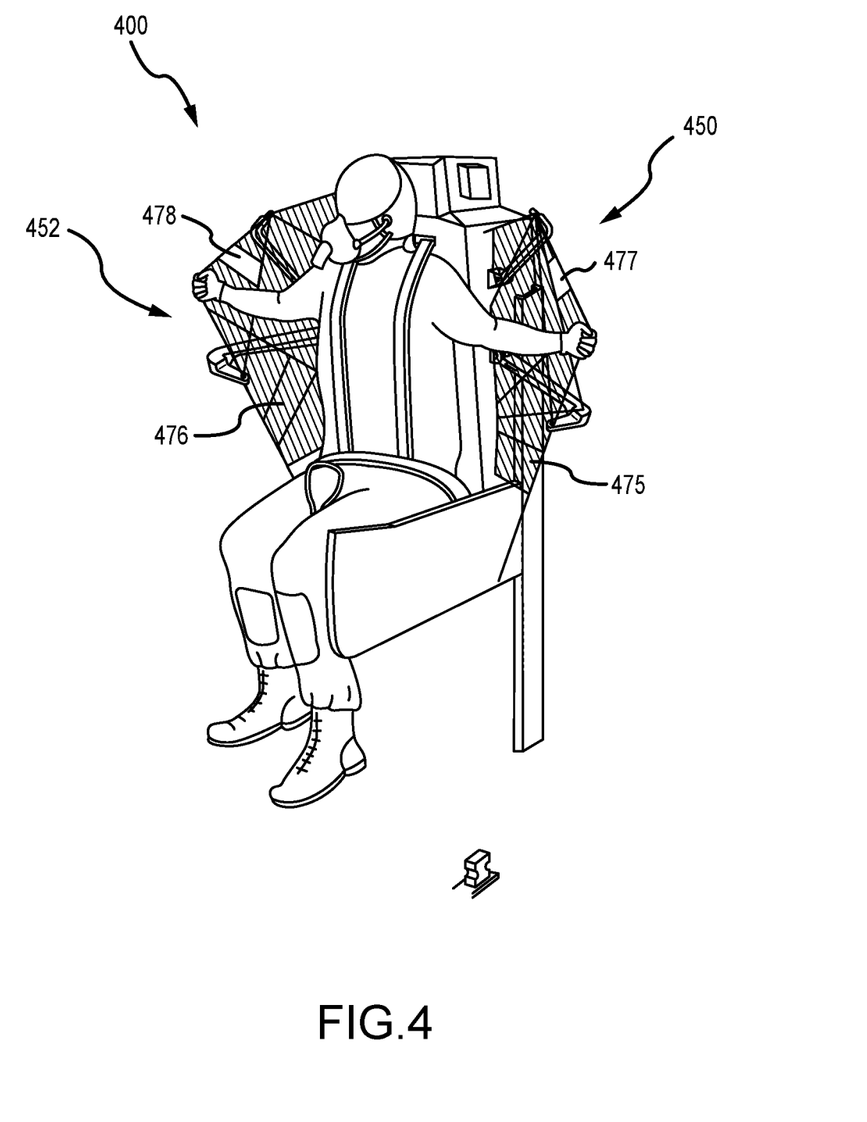
FIG. 4 provides a schematic view of an ejection seat having a center-of-pressure arm restraint system, in accordance with various embodiments.

Referring now to FIG. 4, an ejection seat 400, similar to the ejection seat 300 described above with reference to FIGS. 3A-3C, is illustrated. For purposes of discussion, the ejection seat 400 is identical to the ejection seat 300, excepting the structure of the aerodynamic control mechanisms incorporated into the backstops. For example, in various embodiments, a first backstop 450 includes a first sheet 475 (or a first plurality of patches) that generally spans the entire frontal area of the net structure of the first backstop 450; the structure of the first backstop 450 (e.g., the upper and lower support arms and the cables or shrouds comprising the net structure) may, in various embodiments, be the same as the structure that comprises the first backstop 350 described above. In various embodiments, the first sheet 475 comprises a first sheet of material, cut to fit the frontal area of the net structure of the first backstop 450 when deployed, and incorporated into the first backstop 450. In various embodiments, the first sheet 475 comprises a first plurality of patches, the collection of which are cut to collectively fit the frontal area of the net structure of the first backstop 450 when deployed, with each of the patches being incorporated into the cables or shrouds that comprise the net structure of the first backstop 450. As illustrated, a first cutout 477 is positioned within the first sheet 475. In various embodiments, the first cutout 477 may be formed by removing a section of the first sheet of material prior to incorporating the first sheet of material into the net structure comprising the first backstop 450. In various embodiments, the first cutout may be formed by simply not incorporating one of the first plurality of patches that would otherwise collectively span the frontal area of the net structure of the first backstop 450 when deployed. In a manner similar to the foregoing, a second cutout 478 is positioned within a second sheet 476 forming a second backstop 452.

Similar to placement of the patches (e.g., the first patch 371, the second patch 372, the third patch 373 and the fourth patch 374 described above), the first cutout 477 and the second cutout 478 may be sized to span triangular or quadrilateral or, more generally, polygonal spaces or empty regions (regular or irregular), the size and shape of which may be configured to control the aerodynamic forces on the ejection seat, including the backstops, when deployed. Effective placement and sizing of the cutouts, which may be determined through wind-tunnel testing or computational fluid dynamics modeling, may result in a reduction in, for example, the pitch and yaw of the ejection seat and the pilot during an ejection sequence or process into a high speed windblast. Further, in various embodiments, the cutouts on the backstops are not positioned symmetrically on the net structures of both the first backstop 450 and the second backstop 452. This latter feature enables, for example, weight imbalances with the ejection seat 400 to be compensated for by generating different moment arms that act on the seat, thereby generating a torque on the seat that act to counterbalance a tendency of the seat to pitch or yaw due to a weight imbalance.

Finally, as may be appreciated from the above description, embodiments similar to those represented by FIG. 4 may be constructed in a manner similar to construction of the embodiments represented by FIG. 3C by filling the respective net structures comprising the first backstop 350 and the second backstop 352 with patches. Likewise, embodiments similar to those represented by FIG. 3C may be constructed in a manner similar to construction of the embodiments represented by FIG. 4 by filling the respective net structures comprising the first backstop 450 and the second backstop 452 with cutouts. Thus, a progression between the embodiments represented by FIGS. 3C and 4 is contemplated, such that, in various embodiments, the percentage frontal area of a first backstop or a second backstop is covered by patches (or by a sheet or material) between about five percent (5%) (e.g., as illustrated in FIG. 3C) and about ninety-five percent (95%) (e.g., as illustrated in FIG. 4); or, in various embodiments, between about twenty-five percent (25%) and about seventy-five percent (75%); or, in various embodiments, between about forty-five percent (45%) and about fifty-five percent (55%); or, in various embodiments, about fifty percent (50%).

The above disclosure provides an ejection seat that affords increased safety for pilots during the extreme loadings experienced in the windblast phase of a thru-canopy ejection. The center-of-pressure arm restraint system is configured to reduce pitch and yaw of the ejection seat, which can reduce the risk of collision between pilots during an ejection operation. Reduction in pitch and yaw also reduces the chance of whiplash or other injuries to the pilot and increases the safety of the pilot when separating from the ejection seat and deploying the parachute. In addition, the aerodynamic control mechanisms incorporated into the backstops create additional drag, which acts to more quickly reduce the velocity of the ejection seat and the pilot in the airstream upon ejection, while adding negligible weight to the ejection seat through the disclosed design.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An ejection seat, comprising:
    a seat frame having a seat-back and a seat-pan adapted to support an occupant, the ejection seat further comprising a propulsion system configured to propel the ejection seat from an aircraft; and
    a backstop configured to deploy laterally outward from the seat-back to form a forward-facing surface, the backstop including a net structure and an aerodynamic control mechanism incorporated into the net structure.

2. The ejection seat of claim 1, wherein the aerodynamic control mechanism includes a first patch incorporated into the net structure.

3. The ejection seat of claim 2, wherein the aerodynamic control mechanism includes a second patch incorporated into the net structure.

4. The ejection seat of claim 3, wherein the backstop defines a frontal area when deployed and the first patch is configured to cover about five percent of the frontal area.

5. The ejection seat of claim 4, wherein the second patch is configured to cover about five percent of the frontal area.

6. The ejection seat of claim 1, wherein the aerodynamic control mechanism includes a first cutout incorporated into a sheet of material.

7. The ejection seat of claim 6, wherein the aerodynamic control mechanism includes a second cutout incorporated into the sheet of material.

8. The ejection seat of claim 7, wherein the backstop defines a frontal area when deployed, the sheet of material is configured to cover the frontal area, and the first cutout is sized to span about five percent of the frontal area.

9. The ejection seat of claim 8, wherein the second cutout is sized to span about five percent of the frontal area.

10. An ejection seat for an aircraft, comprising:
    a seat frame having a seat-back and a seat-pan adapted to support an occupant; and
    a backstop configured to deploy laterally outward from the seat-back to form a forward-facing surface that defines a frontal area, the backstop including
        an upper support arm and a lower support arm configured to support a plurality of shrouds forming a net structure and
        an aerodynamic control mechanism incorporated into the net structure, the aerodynamic control mechanism comprising a sheet of material.

11. The ejection seat of claim 10, wherein the sheet of material is configured to cover between about twenty-five percent and about seventy-five percent of the frontal area.

12. The ejection seat of claim 10, wherein the sheet of material includes a first patch, the first patch configured to cover about five percent of the frontal area.

13. The ejection seat of claim 12, wherein the sheet of material includes a second patch, the second patch configured to cover about five percent of the frontal area.

14. The ejection seat of claim 13, wherein the first patch is spaced a distance from the second patch.

15. The ejection seat of claim 10, wherein the sheet of material includes a first patch, the first patch being secured to one or more of the plurality of shrouds.

16. The ejection seat of claim 15, wherein the first patch includes a portion secured to the seat frame.

17. The ejection seat of claim 16, wherein the sheet of material includes a first cutout configured to span at least about five percent of the frontal area.

18. The ejection seat of claim 17, wherein the sheet of material includes a second cutout configured to span at least about five percent of the frontal area.

19. The ejection seat of claim 18, wherein the first cutout is spaced a distance from the second cutout.

20. The ejection seat of claim 10, wherein the sheet of material includes a patch and a cutout adjacent the patch.

* * * * *